United States Patent
Burdock et al.

(10) Patent No.: US 6,526,342 B1
(45) Date of Patent: Feb. 25, 2003

(54) VEHICLE SUSPENSIONS

(75) Inventors: William Burdock, Sutton Coldfield (GB); Ben Harrison, Coventry (GB)

(73) Assignee: Land Rover, Warwick (GB)

( * ) Notice: Subject to any disclaimer, the term of this patent is extended or adjusted under 35 U.S.C. 154(b) by 0 days.

(21) Appl. No.: 09/807,555

(22) PCT Filed: Sep. 15, 1999

(86) PCT No.: PCT/GB99/03069

§ 371 (c)(1),
(2), (4) Date: May 16, 2001

(87) PCT Pub. No.: WO00/23291

PCT Pub. Date: Apr. 27, 2000

(30) Foreign Application Priority Data

Oct. 16, 1998 (GB) ............................................. 9822520

(51) Int. Cl.[7] .............................................. B60G 23/00
(52) U.S. Cl. .......................................... 701/37; 280/5.5
(58) Field of Search ...................... 701/37, 38; 280/5.5, 280/5.507

(56) References Cited

U.S. PATENT DOCUMENTS

| 5,072,392 A | 12/1991 | Taniguchi | 364/424.05 |
|---|---|---|---|
| 5,367,459 A | 11/1994 | Shtarkman | 364/424.05 |
| 5,483,446 A | 1/1996 | Nobuo et al. | 701/1 |
| 5,742,919 A | 4/1998 | Ashrafi | 701/70 |

FOREIGN PATENT DOCUMENTS

| EP | 0803386 | 10/1997 |
|---|---|---|
| EP | 0809167 | 11/1997 |
| GB | 2289111 | 11/1995 |
| JP | 01095923 | 4/1989 |
| JP | 02281149 | 11/1990 |
| JP | 08258528 | 10/1996 |
| JP | 09318660 | 12/1997 |
| WO | WO/8900927 | 2/1989 |

*Primary Examiner*—Yonel Beaulieu
(74) *Attorney, Agent, or Firm*—Davis & Bujold, P.L.L.C.

(57) ABSTRACT

An active vehicle roll control system is disclosed in which a roll bar (22) has two halves (22a, 22b) which can be rotated relative to each other by a control unit (26) in order to actively control vehicle roll. The control unit (26) receives signals from lateral accelerometers (29, 30). In order to determine accurately when the vehicle is experiencing zero lateral acceleration, the control unit (26) averages the signal from each accelerometer (29, 30) continuously and uses the average signal as an indication of the straight ahead position. The averaging algorithm defines a window of low lateral accelerations to be used, and a gain to be applied to the acceleration signals, each of which is speed dependent so that the averaging process is not affected by abnormal vehicle movements.

15 Claims, 3 Drawing Sheets

VEHICLE SUSPENSIONS

The present invention relates to accelerometers used in active suspension systems for vehicles, and in particular to their calibration.

BACKGROUND OF THE INVENTION

It is known, for example as discussed in U.S. Pat. No. 5,742,919, that accelerometers used for controlling vehicle suspensions are subject to drift and other sources of inaccuracy, and that they need to be calibrated or checked in some way. The method proposed for this in U.S. Pat. No. 5,742,919 is to use different sensors on the vehicle to measure the same parameter, and thereby check that the measured values are correct. However, this requires there to be a large number of sensors and a certain amount of duplication of measurements.

SUMMARY OF THE INVENTION

The present invention provides a vehicle suspension system including a control means arranged to respond to signals from a lateral accelerometer arranged to measure lateral acceleration of the vehicle characterized in that the control means is arranged to measure an average of the signal from the accelerometer over time to determine a reference signal which corresponds to zero lateral acceleration, and to compare the instantaneous signal with the reference signal to measure the instantaneous lateral acceleration.

Preferably the control means is arranged to continually update the average during use of the vehicle. This ensures that any drift in the accelerometer is compensated for.

For example the average may be produced by integrating over time the value of the signal from the accelerometer.

Preferably the average is a weighted average. For example weighting factor may be used which preferably dependent on the instantaneous speed of the vehicle is arranged to bias the averaging towards signals produced when the lateral acceleration is low. Preferably the weighting factor is greatest at a predetermined vehicle speed and falls off at speeds higher than said predetermined speed and at speeds lower than said predetermined speed.

Preferably signals corresponding to lateral accelerations above a predetermined maximum value, which may vary with the speed of the vehicle, and is preferably zero for low vehicle speeds, are not included in the averaging process.

BRIEF DESCRIPTION OF THE DRAWINGS

Preferred embodiments of the present invention will now be described by way of example only with reference to the accompanying drawings in which.

DETAILED DESCRIPTION OF PREFERRED EMBODIMENTS

Figure 1:
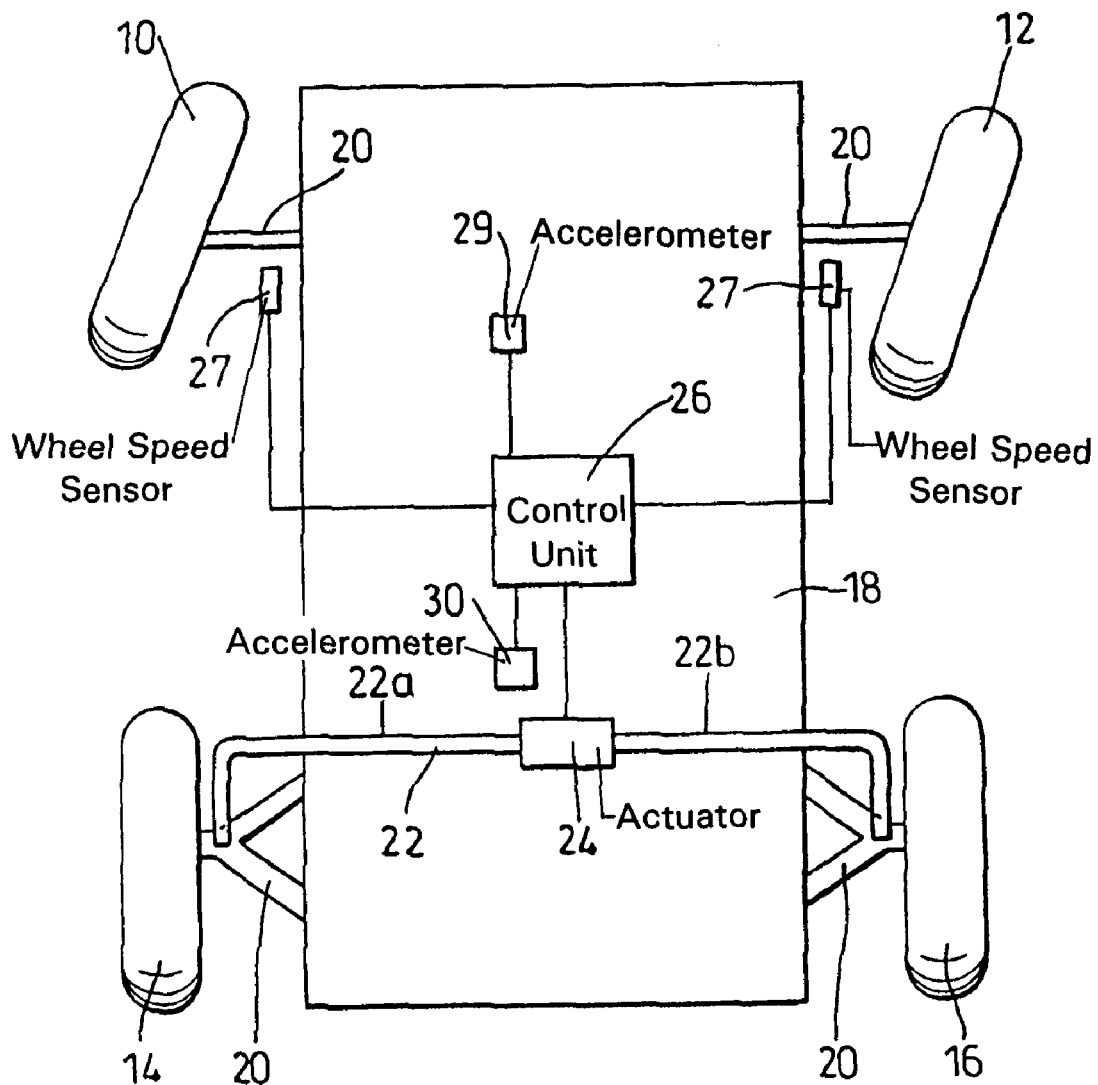
FIG. 1 is a diagrammatic representation of a vehicle including a suspension according to an embodiment of the invention.

Referring to FIG. 1, a four-wheel-drive off-road vehicle has four wheels 10, 12, 14, 16 each mounted on the vehicle body 18. The vehicle has an independent suspension, each of the wheels being attached to the body 18 through a suspension arm 20 so that it can move vertically relative to the body 18. An anti-roll bar 22 is connected between the two rear wheels 14, 16 to control the roll of the rear of the vehicle. The anti-roll bar 22 is split in the middle into two halves 22a, 22b which can be rotated relative to each other by a rotary actuator 24 under the control of a control unit 26. This enables vehicle roll to be controlled actively in response to signals input to the control unit from wheel speed sensors 27 first and second lateral accelerometers 29, 30 which provide signals indicative of the acceleration of parts of the vehicle body in various directions. A similar anti-roll bar, which is not shown, would also normally be connected between the front wheels 10, 12. The control unit 26 can control the actuator 24 so as to tend to resist vehicle roll by applying a torque between the two halves of the anti-roll bar, the magnitude of which is dependent on the lateral acceleration of the vehicle as measured by the accelerometers 29, 30.

Clearly in order to operate accurately the control unit needs to be able to determine accurately the lateral acceleration of the vehicle from the signals it receives from the accelerometers 29, 30. However, these signals tend to drift over time and to change with temperature. Accordingly the control unit is arranged to continuously monitor the accelerometer signals over time and to determine from them a reference signal for each accelerometer corresponding to zero lateral acceleration. This reference signal is continually updated during use of the vehicle. Then to measure lateral acceleration it can compare the instantaneous signal from each accelerometer with the reference signal to measure the instantaneous lateral acceleration experienced by the accelerometer.

Figure 2:
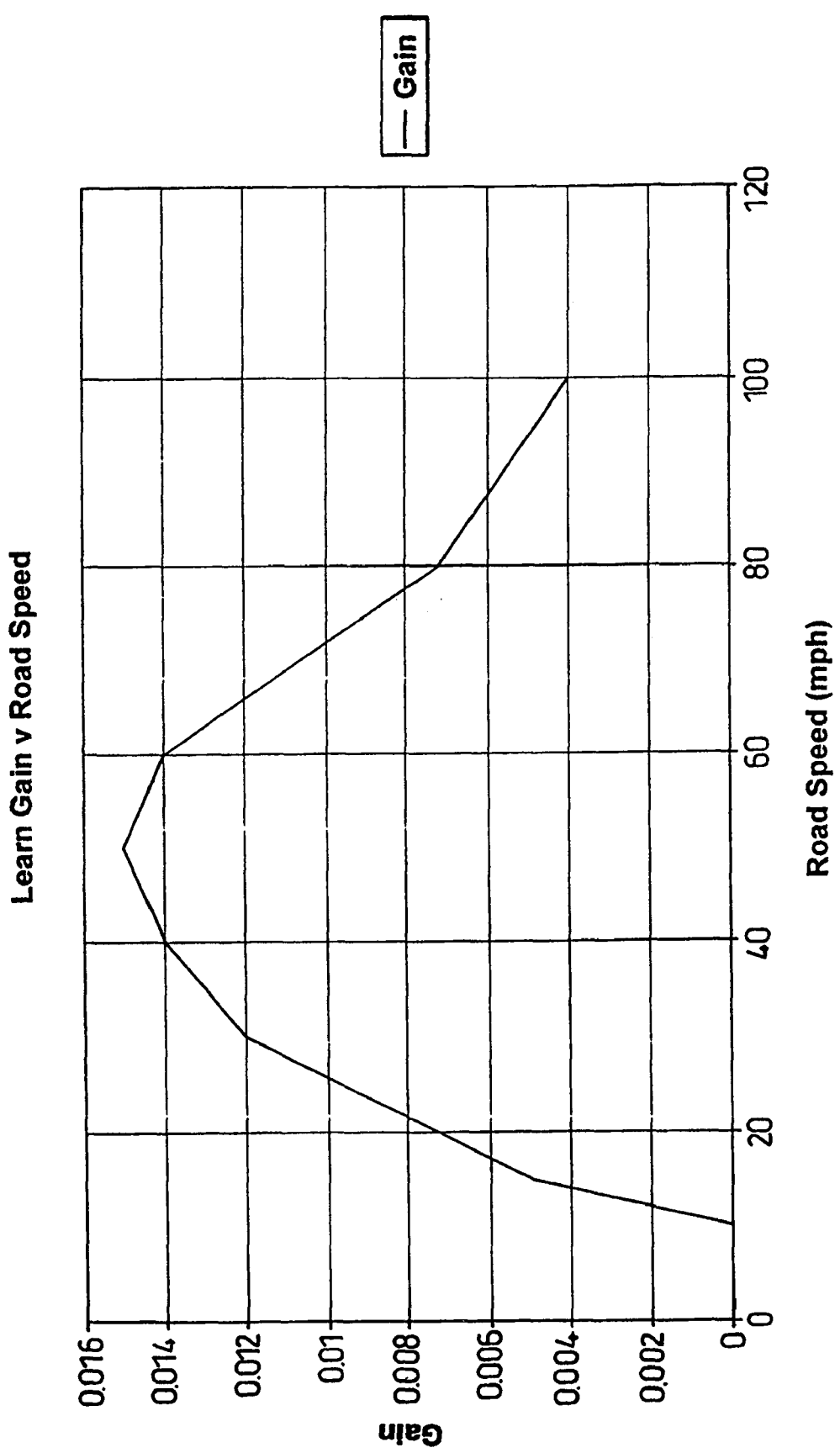
FIGS. 2 and 3 are graphs showing zero learning characteristics of an accelerometer forming part of the system of FIG. 1.

The reference signal is determined, or learnt, by means of calculating a running average of the accelerometer signal over time. This is done by continuously integrating the accelerometer signal. However the average includes a weighting factor, in the form of a signal gain on the input to the integration, which varies with road speed as shown in FIG. 2. The gain is zero at road speeds below 10 mph from where it increases towards a peak at 50 mph and then falls off again at higher speeds. This gain characteristic is arranged so that the averaging process is biased towards speeds when the vehicle is likely to be travelling in a straight line and lateral accelerations are likely not to be high. It is zero at very low speeds where the vehicle is likely to be off road and experiencing high lateral accelerations, and is low at high speeds when even gentle cornering can produce high lateral accelerations.

Figure 3:
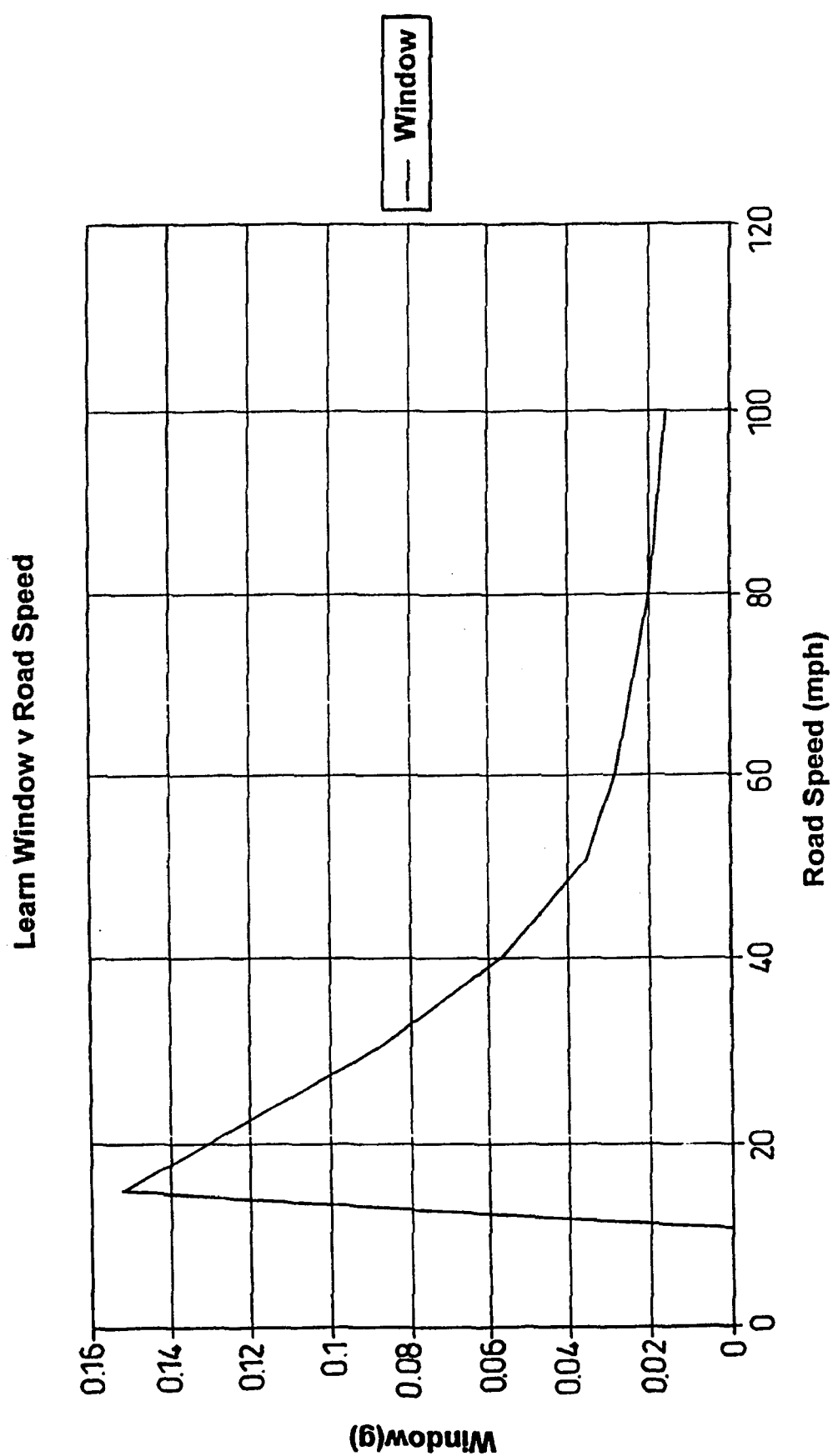

Referring to FIG. 3, the zero learning algorithm also defines a window of low lateral accelerations which are taken into account in the averaging process, i.e. which are included in the integrating process. Any larger lateral accelerations, the magnitude of which is outside the window, are ignored and therefore not included in the integration. As can be seen, the breadth of the window is dependent on the ground speed of the vehicle. At low speeds, below 10 mph, the window has zero width. This is consistent with the zero gain at such speeds and ensures that, at low speeds, all accelerations are ignored. This is so that if the vehicle is parked or travelling slowly on a side slope, this will not affect the centring effect of the averaging process. From 10 mph the window broadens out rapidly to a maximum width of 0.15 g at 14 mph. It then drops off at a gradually decreasing rate as the vehicle speed increases up to 100 mph, where the width of the window is 0.015 g. The reason for this is that, as with the gain control, the algorithm is intended to learn mostly, or exclusively, on normal, straight ahead, driving. At lower speeds rough roads and sharp bends can produce relatively high lateral accelerations during such driving, hence the wide window at lower speeds. At higher speeds roads will generally be smoother and corners more gentle, so any lateral acceleration above a low limit, of the order of 0.02 g at 80 mph for example, is indicative of abnormal driving conditions which do not want to be included in the averaging process.

It will also be understood that the present invention is suitable for roll control systems using any of a variety of known actuators to control vehicle roll. For example independent air suspension systems which include a roll control strategy in the control of air pressure in the gas struts at each of the wheels could use the present invention, as could systems using an anti-roll bar with other forms of actuator, such as those having a hydraulically operated strut to control rotation of one end of the anti-roll bar about the central torsion part of the bar, as shown, for example, in WO98/26948.

What is claimed is:

1. A vehicle suspension system including a lateral accelerometer arranged to produce a lateral acceleration signal, and a control means arranged to receive the lateral acceleration signal, to measure an average value of the signal over time and to determine from the average value a reference value which corresponds to zero lateral acceleration, and to measure an instantaneous value of the signal and compare the instantaneous value with the reference value to measure an instantaneous lateral acceleration, the average value is a weighted average produced using a weighting factor and by integrating over time the instantaneous value of the lateral acceleration signal.

2. The system according to claim 1, wherein the weighting factor is arranged to bias the average value towards the value of signals produced when the lateral acceleration is low.

3. The system according to claim 2, wherein the control means is arranged to define a maximum value of the lateral acceleration and, when determining the average value, to exclude signals corresponding to lateral accelerations above the maximum value.

4. The system according to claim 3, further including a vehicle speed sensor wherein the control means is arranged to monitor vehicle speed using the speed sensor and to vary the maximum value in response to variations in the vehicle speed.

5. The system according to claim 4, wherein the control means is arranged to define said maximum value as zero when the vehicle speed is below a predetermined minimum speed.

6. The system according to claim 1, further comprising a vehicle speed sensor for measuring an instantaneous speed of the vehicle, wherein the control means is arranged such that the weighting factor is dependent on the instantaneous speed of the vehicle.

7. The system according to claim 6, wherein the control means defines a predetermined vehicle speed, and is arranged such that the weighting factor is greatest at the predetermined vehicle speed and falls off at speeds higher than said predetermined vehicle speed and at speeds lower than said predetermined vehicle speed.

8. The system according to claim 7, wherein said predetermined vehicle speed is about 50 mph.

9. A vehicle suspension system including a lateral accelerometer arranged to produce a lateral acceleration signal, and a control means arranged to receive the lateral acceleration signal, to measure an average value of the signal over time and to determine from the average value a reference value which corresponds to zero lateral acceleration, and to measure an instantaneous value of the signal and compare the instantaneous value with the reference value to measure an instantaneous lateral acceleration; and wherein the average value is produced by integrating over time the instantaneous value of the lateral acceleration signal and the average value is a weighted average produced using a weighting factor which is arranged to bias the average value towards the value of signals produced when the lateral acceleration is low.

10. The system according to claim 9, wherein the control means is arranged to define a maximum value of the lateral acceleration and, when determining the average value, to exclude signals corresponding to lateral accelerations above the maximum value.

11. The system according to claim 10, further including a vehicle speed sensor wherein the control means is arranged to monitor vehicle speed using the speed sensor and to vary the maximum value in response to variations in the vehicle speed.

12. The system according to claim 11, wherein the control means is arranged to define said maximum value as zero when the vehicle speed is below a predetermined minimum speed.

13. The system according to claim 9, further comprising a vehicle speed sensor for measuring an instantaneous speed of the vehicle, wherein the control means is arranged such that the weighting factor is dependent on the instantaneous speed of the vehicle.

14. The system according to claim 13, wherein the control means defines a predetermined vehicle speed, and is arranged such that the weighting factor is greatest at the predetermined vehicle speed and falls off at speeds higher than said predetermined vehicle speed and at speeds lower than said predetermined vehicle speed.

15. The system according to claim 14, wherein said predetermined vehicle speed is about 50 mph.

* * * * *